United States Patent [19]

Terlizzi, Jr. et al.

[11] Patent Number: 4,672,793
[45] Date of Patent: Jun. 16, 1987

[54] MOLDED MEAT VACUUM PACKAGING

[75] Inventors: Frank M. Terlizzi, Jr., Clemson, S.C.; Bernardus G. Langen, Oeffelt, Netherlands

[73] Assignee: W. R. Grace & Co., Duncan, S.C.

[21] Appl. No.: 568,772

[22] Filed: Jan. 6, 1984

[51] Int. Cl.[4] .............................................. B65B 31/00
[52] U.S. Cl. ........................................ 53/434; 53/122; 53/512; 17/49; 426/410; 426/414
[58] Field of Search ............ 17/41, 49; 53/122, 138 A, 53/296, 372, 434, 436, 512, 578, 579, 583, 585, 129, 527, 130, 289, 319, 320; 100/229 A, 251; 141/313; 426/413, 125, 414, 412, 410, 411

[56] References Cited

U.S. PATENT DOCUMENTS

| 1,486,476 | 3/1924 | Bloss . | |
| 2,166,568 | 7/1939 | Kuhlke . | |
| 2,471,867 | 5/1949 | Fisher et al. . | |
| 2,635,799 | 4/1953 | Hoy | 53/122 X |
| 2,696,442 | 12/1954 | Allbright . | |
| 2,779,681 | 12/1957 | Sell . | |
| 2,886,073 | 5/1959 | Beck | 53/122 X |
| 2,946,166 | 7/1960 | Baxter | 53/530 |
| 3,235,389 | 2/1966 | Hertwig . | |
| 3,336,425 | 8/1967 | Valyi | 53/578 X |
| 3,563,764 | 2/1971 | Posegate . | |
| 3,574,642 | 4/1971 | Weinke . | |
| 3,607,312 | 9/1971 | Ready . | |
| 3,611,657 | 10/1971 | Inoue et al. | 53/551 X |
| 3,673,041 | 6/1972 | Schulz et al. . | |
| 3,703,064 | 11/1972 | Lugiewicz | 53/122 X |
| 3,740,921 | 6/1973 | Meyer | 53/512 |
| 3,760,556 | 9/1973 | Morris | 53/530 X |
| 3,777,331 | 12/1973 | Falborg | 53/530 X |
| 3,845,606 | 11/1974 | Wilson . | |
| 3,853,999 | 12/1974 | Kentor . | |
| 3,928,938 | 12/1974 | Burrell . | |
| 3,987,209 | 10/1976 | Gatineau . | |
| 4,073,229 | 2/1978 | O'Rourke et al. | 100/229 A X |
| 4,108,063 | 8/1978 | Randolph | 100/251 X |
| 4,132,048 | 1/1979 | Day . | |
| 4,185,441 | 1/1980 | Hoyt | 53/512 X |
| 4,251,976 | 2/1981 | Zanni . | |
| 4,285,980 | 8/1981 | Lewis . | |
| 4,287,218 | 9/1981 | Rich et al. . | |
| 4,363,822 | 12/1982 | Kleptz . | |
| 4,466,464 | 8/1984 | Kupcikevicius . | |
| 4,466,465 | 8/1984 | Frey . | |
| 4,466,466 | 8/1984 | Randys . | |
| 4,506,494 | 3/1985 | Shimoyama et al. | 53/551 |
| 4,510,733 | 4/1985 | Hansen et al. | 53/512 X |

FOREIGN PATENT DOCUMENTS

| 715805 | 8/1965 | Canada | 53/436 |
| 284431 | 7/1913 | Fed. Rep. of Germany | 53/578 |
| 2030913 | 12/1971 | Fed. Rep. of Germany | 53/527 |
| 2810244 | 9/1979 | Fed. Rep. of Germany | 141/313 |
| 1521675 | 4/1968 | France . | |
| 2139459 | 1/1973 | France . | |
| 2309152 | 11/1976 | France . | |
| 755578 | 8/1956 | United Kingdom | 53/512 |
| 1329399 | 9/1973 | United Kingdom . | |
| 1516498 | 7/1978 | United Kingdom . | |
| 2075459A | 11/1981 | United Kingdom . | |
| 2102372A | 2/1983 | United Kingdom . | |

OTHER PUBLICATIONS

Belam Vacuum Meat Press brochure.
Robot 1000 S3 brochure.

Primary Examiner—Robert L. Spruill
Assistant Examiner—Steven P. Weihrouch
Attorney, Agent, or Firm—John J. Toney; William D. Lee, Jr.; Mark B. Quatt

[57] ABSTRACT

A method is provided for vacuum packaging a molded meat product in a cook-in bag that includes the steps of vacuum stuffing a substantially deaerated moldable meat product into a thermoplastic bag lining a cooking mold, the bag having a length greater than the mold to define a bag neck; substantially removing any meat from the bag neck; and then, while still under vacuum, gathering and clipping the bag neck. Associated apparatus for carrying out the method is also provided.

1 Claim, 4 Drawing Figures

MOLDED MEAT VACUUM PACKAGING

BACKGROUND OF THE INVENTION

This invention relates generally to vacuum meat stuffing and relates more particularly to vacuum packaging of a molded meat product in a thermoplastic bag suited for cook-in use.

In vacuum meat pressing, a portion of a moldable raw meat, such as sectioned ham, is pressed while under vacuum into a cooking mold having a generally cylindrical shape, then cooked while in the mold, and thereafter packaged as a pre-cooked compacted meat product. Alternatively, the raw meat may be pressed into a can or fibrous casing. Conventionally, a vacuum meat press refers to a meat press that operates inside a vacuum chamber. In operation, first a moldable raw meat portion is placed inside a stuffing horn within the vacuum chamber, then the chamber is closed and a vacuum drawn, and then a plunger pushes the moldable raw meat through the stuffing horn into a cooking mold initially placed over the discharge end of the stuffing horn. As the mold is filled by advancement of the plunger, the mold retracts from the stuffing horn along a guide that exerts selected resistance to retraction of the mold, such as by a pneumatic cylinder, to yield a selected extent of compaction in the pressed raw meat. THe vacuum chamber is then opened, and the filled mold removed for cooking. Cooking is done usually by immersion in hot water or steam typically at 155°–170° F. for 3-5 hours.

Representatively, such a vacuum meat press is commercially available from Belam B. V. of Uden, Holland. The Belam vacuum meat press has the feature that as the vacuum is drawn, a holding period is allowed to elapse sufficient to deaerate the raw meat before pressing to eliminate residual air pockets within the meat and thereby to produce a sold, cavity free product.

It is the aim of the present invention to provide an improvement in vacuum meat stuffing whereby, concurrent with vacuum stuffing, a raw meat portion is vacuum packaged in a shrink bag suitable for cook-in and shipment of a molded, pre-cooked meat product. Advantageously, such a pre-packaged food product is shipped and marketed, while remaining in its cook-in packaging. A problem in conventional vacuum packaging of molded meat products in thermoplastic bags is incomplete vacuumizing due to entrapped residual air.

The term "cook-in" as pertains to packaging is intended to refer to packaging material structurally capable of withstanding exposure to cook-in time-temperature conditions while containing a food product. The packaging material properly characterized as cook-in will maintain seal integrity and will be delamination resistant under such conditions. The packaging material will also be heat shrinkable under these conditions so as to form a neatly fitting package and preferably should have a tendency toward product adhesion to minimize "cook-out" or collection of fluids between the surface of the food product and the interior surface of the bag.

Of general interest concerning the present invention is the disclosure of U.S. Pat. No. 4,285,980 for "Method For Preparing Molded Poultry Product" issued Aug. 25, 1981 to Lewis, directed to molding and precooking a poultry product using a mold and a flexible bag withing the mold into which poultry meat is flowed followed by closing the bag and cooking the molded poultry by heating the mold.

Of general interest is the disclosure of U.S. Pat. No. 2,779,681 for "Method Of Preparing And Packaging Meat" issued Jan. 29, 1957 to Sell, directed to packaging meat in the ready-to-eat condition by vacuum packaging meat pieces in a shrinkable bag, then shrinking the bag to press the meat pieces contained therein, and then cooking the packaged meat.

Of general interest is the disclosure of U.S. Pat. No. 3,928,938 for "Method For Evacuating Packages" issued Dec. 30, 1974 to Burrell, directed to dual chamber vacuum packaging in thermoplastic bags utilizing in-chamber gathering and clipping apparatus for bag closure.

Of general interest is the disclosure of U.S. Pat. No. 4,043,011 for "Packaging Machines" issued Aug. 23, 1977 to Giraudi et al, directed to an in-chamber gathering and clipping system wherein gathering arms are rotated about a hub and a clip punch is driven to advance a clip from within the hub onto a bag neck gathered by the gathering arms.

SUMMARY OF THE INVENTION

The present invention provides an improvement in vacuum meat stuffing whereby, concurrent with vacuum stuffing, deaerated moldable meat is compacted into a thermoplastic bag, and then the bag is vacuum closed. Thus, in a single vacuumized operaton a moldable meat product is deaerated, stuffed, and vacuumed packaged, representatively in a cook-in bag. By combining the vacuum stuffing and vacuum packaging in a single vacuumized operation, not only is a second vacuumizing step eliminated, but by virtue of the meat being deaerated immediately prior to stuffing, entrapped residual air is substantially eliminated in the final vacuum package.

Accordingly, there is provided in a method for vacuum meat stuffing an improvement comprising vacuum stuffing a substantially deaerated moldable meat product into a thermoplastic bag lining a cooking mold, the bag having a length greater than the mold to define a bag neck portion; substantially removing any meat from the bag neck; and then, while still under vacuum, gathering and clipping the bag neck.

Preferably, the method for vacuum packaging a molded meat product comprises loading a moldable meat product into a stuffing horn of a meat stuffer within a vacuum chamber; placing a thermoplastic bag onto the horn, and then a cooking mold over the bag so that the bag lines the mold, the length of the bag being greater than the length of the mold to define a bag neck portion; then vacuumizing the chamber, and after a holding period sufficient to deaerate the meat, then advancing the meat from said horn to fill the bag lined mold, substantially removing any meat from the bag neck; retracting the mold from the horn; and closing the bag neck by gathering and clipping, followed by venting the vacuum chamber.

Additionally, there is provided apparatus for vacuum packaging a molded meat product comprising means for vacuum stuffing a substantially deaerated moldable meat product into a thermoplastic bag lining a cooking mold, the bag having a length greater than the mold to define a bag neck portion; means for substantially removing any meat from the bag neck; and means for closing the bag, while still under vacuum, by gathering and clipping the bag neck.

BRIEF DESCRIPTION OF THE DRAWINGS

Further details are given below with reference to the drawings wherein.

DESCRIPTION OF THE PREFERRED EMBODIMENTS

Figure 1:
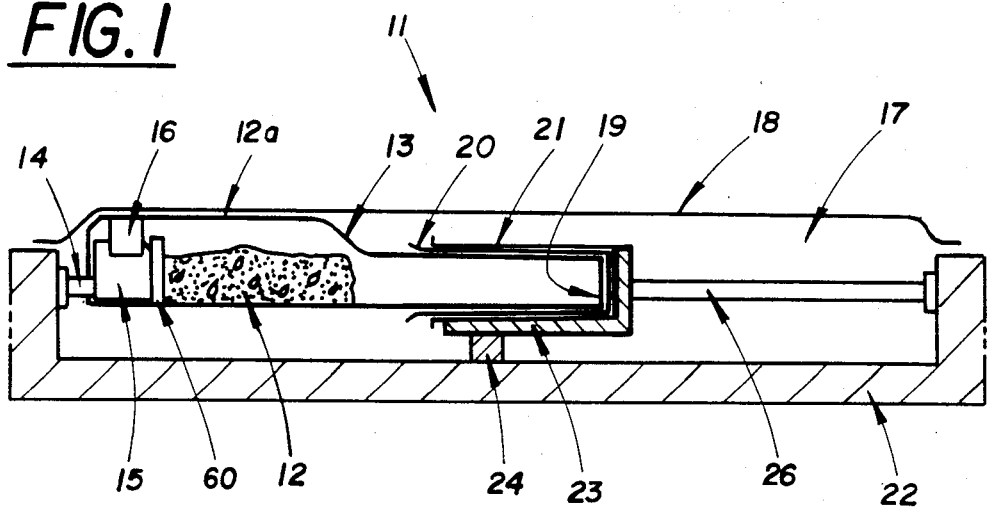
FIGS. 1-3 schematically show, in side view cross-section, the steps in operating a vacuum meat press according to an embodiment of the invention.

Referring specifically to the drawings, in FIG. 1, there is shown in schematic cross-section a representative vacuum meat press modified in accordance with the invention and configured in the beginning step of an operational cycle. During an operating cycle, a raw moldable meat portion is loaded into the press, the press is vacuumized to deaerate the meat, then the moldable meat is pressing into shape under vacuum into a cook-in bag lined cooking mold, and while still under vacuum the bag is closed by gathering and clipping. Vacuum meat press 11 shown in its initial configuration has a portion of moldable raw meat 12, such as sectioned and massaged raw ham, placed inside stuffing horn 13. Stuffing horn 13 is generally a hollow elongate structure having an open discharge end at 19 and an access port at 12a for initially placing the meat portion into the horn. At the loading end of the horn is a pneumatically driven plunger 14 with ram 15 closely fitting inside horn 13, the close fit being provided by sliding friction element 16 which is urged against the inside surface of horn 13 by a compressed spring internal to ram 15 (not shown). The apparatus is situated inside a vacuum chamber 17 defined by a machine base 22 and a hinged lid 18. Over the discharge end 19 of horn 13, there is placed first a thermoplastic bag 20, then a cooking mold 21 is placed over bag 20, so that the bag lines the cooking mold, the combination being inserted onto the discharge end of the stuffing horn. Carrier 23 is brought under the cooking mold, the carrier riding on a sliding friction foot 24 and being attached to the end of a retraction plunger 26 which is preferably pneumatically actuated. Thus, in setting-up the initial configuration of the apparatus 11 at the beginning of an operating cycle, ram 15 is fully retracted as shown, and, with closure lid 18 open, a raw meat portion 12 is placed inside horn 13. A thermoplastic bag 20 is placed over discharge end 19 of the horn, then a cooking mold 21 is placed over the bag and carrier 23 is brought under the bag lined mold by advancing retraction plunger 26 against the end of the stuffing horn. After lid 18 is closed, vacuum chamber 17 is vacuumized by a conventional vacuum source (not shown). Before pressing begins, there is a brief holding period of several seconds sufficient to deaerate the raw meat portion. This preliminary deaeration is essential so that there will be substantially no entrapped residual air pockets within the final vacuum packaged configuration. At completion of this preparatory deaeration, pressing action is begun. By elimination of air pockets in the final vacuum packaged configuration, the amount of purge accumulating inside the final package over its shelf life is minimized thereby maintaining visual appeal of the packaged product.

Figure 2:
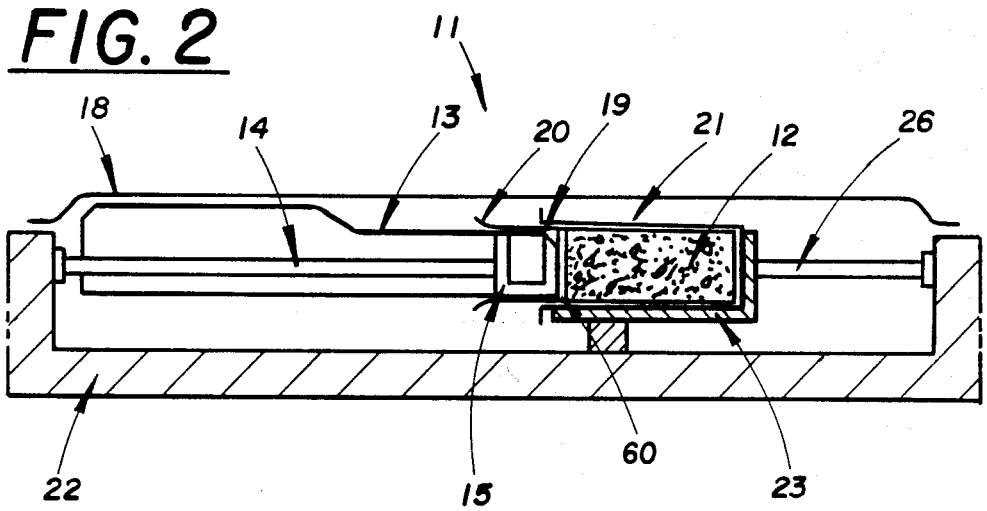

In FIG. 2, there is shown the next step in the vacuum pressing operation wherein ram 15 is driven forward to press the meat portion 12 through the discharge end 19 of stuffing horn 13 into the bag lined mold 20 and 21. As ram 15 is driven forward to stuff the meat into the bag lined mold, the mold on carrier 23 is forced off horn 13. FIG. 2 depicts the end of pressing and the beginning of retraction at the point where the bag lined mold just clears horn 13. When ram 15 is driven forward to its fully extended position at the discharge 19 of horn 13, the pressing step is complete. Retraction plunger 26 tends to counter retraction motion of the mold by a selected extent, representatively exerting a counter-force equal to about 50% of the pressing force exerted by ram 15. The purpose of this counter retraction force of plunger 26 is to achieve a selected extent of compaction of meat portion 12 in the bag lined cooking mold.

Figure 3:
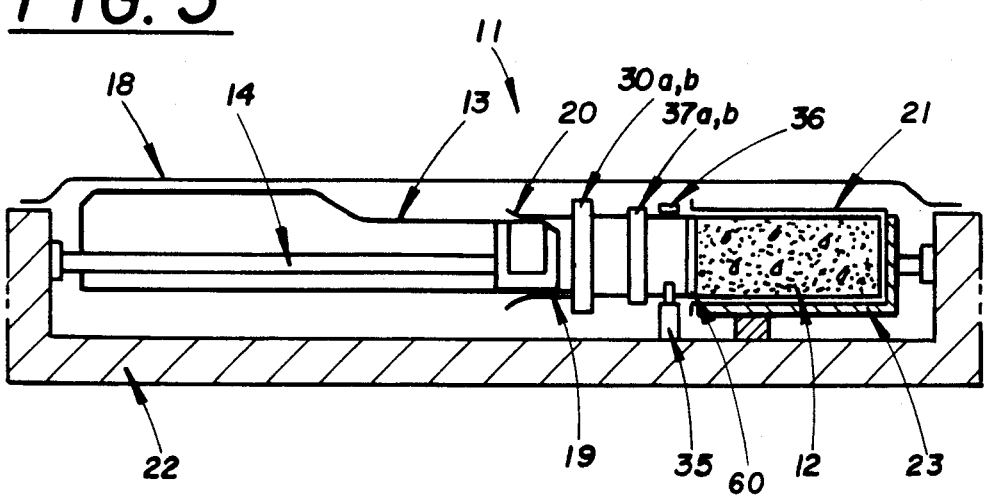

In FIG. 3 there is shown the final step in the vacuum packaging operation. Carrier 23, together with bag lined cooking mold 21, is fully retracted by retraction plunger 26 to sufficiently separate the compacted meat from discharge 19 of horn 13 so that bag 20 may be closed. A pair of lateral press rollers 30a,b, which are pneumatically positioned laterally compress the neck of bag 20. The bag neck is that portion of the bag toward its open end that extends outside the cooking mold beyond the pressed meat. The purpose of press rollers 30a,b is to expel any meat trailings that may remain in the bag neck as a prliminary step to closing the bag. Such expelling action is accomplished by the motion of the bag lined mold during retraction on carrier 23 since the rollers are free-wheeling and not driven. The rolling of press rollers 30a,b is therefore caused by the retraction of carrier 23. The collapsed pinching between rollers 30a,b pushes any meat trailings left in the bag neck outside the bag. The purpose of this expelling action is twofold. First, closing of the bag neck is facilitated as discussed below. Second, any trailings left in the bag neck beyond the bag neck closure would eventually decay thereby rendering the final package unsightly to a consumer. Next, the stuffed bag is closed by gathering and clipping using an in-chamber clipper indicated generally at 35. The in-chamber clipper is representatively of the type disclosed in U.S. Pat. No. 4,043,011 cited above and hereby incorporated by reference. Such a clipper device operates by pivoted gathering arms closing in on the bag neck and collapsing the bag neck in the gathered zone down to about the size of a clip or staple. Then a clip is advanced from a clipper magazine so that the clip is driven around the gathered portion of the bag neck and against a die in one of the gathering arms to cause the clip to be collapsed around the gathered portion of the bag neck thereby forming an air tight seal. Another example of in-chamber clipping is given in U.S. Pat. No. 3,928,938 cited above which schematically shows the steps in a gathering and clipping sequence. To facilitate bag neck gathering by the in-chamber clipper 35, a presser bar 36 and a set of preliminary gathering arms is provided at 37 (indicated generally) which gathers-down the bag neck over clipper 35 so that when the gathering arms of clipper 35 gather-up, the collapsed bag neck will be encircled. Presser Bar 36 and preliminary gatherer 36 are pneumatically actuated toward the end of retraction and before actuation of clipper 35. Representatively, the bag neck portion of bag neck 20 will be about seven inches long, i.e. the bag 20 will extend about seven inches beyond the cooking mold 21 to allow sufficient clearance of the fully retracted bag lined cooking mold from the discharge end 19 of horn 13 while maintaining draping of the bag neck on horn 13, this clearance being sufficient for the operation of presser rolls 30a,b and in-chamber clipper 35. The presser rolls are released as the gathering arms of the clipper are actuated. At this point with the bag being vacuum closed, the operational cycle of the vacuum meat press is complete. Representatively, about 2-8 cycles per minute may be accomplished in semi-continuous operation.

In an alternative mode for removing meat trailings from the bag neck, meat trailings may be prevented from accumulating in the bag neck coincidental with pressing. For example, at the beginning of the operating cycle a plate 60 may be placed at the end of ram 15 so that when ram 15 is actuated to press the meat into the bag lined cooking mold the plate is driven against the raw meat portion 12. Upon ram 15 reaching the end of its travel and the stuffed mold being retracted, the plate remains against the compacted meat in the bag lined mold. Therefore meat trailings are removed from the bag neck coincidental with pressing. Therefore, the means for removing meat trailings from the bag neck can comprise a disposable plate at the pressing surface of the press, the shape of said plate corresponding to the transverse cross-sectional shape of the horn. Meat is removed from the bag neck coincidentally with advancing the meat from the horn to fill the bag lined mold. The disposable plate is advanced behind the meat into the bag lined mold and the bag neck is closed around the plate.

At the conclusion of an operating cycle closure lid 18 of vacuum chamber 17 is opened and the meat stuffed bag lined mold is removed. At this point the raw meat will be pressed and vacuum packaged inside bag 20. The vacuum package inside its cooking mold will then be subjected to cooking conditions, for example by immersion in hot water or steam. Cooking is carried out typically in the 155°-170° F. range for 3-5 hours. Preferably the bag is of a shrink material so that during this cooking step the bag shrinks snuggly around the meat product contained therein to produce a neatly packaged configuration. At the conclusion of the cooking step, the stuffed bag is removed from the cooking mold and is ready for shipment. Since the bag is of the cook-in type, the bag does not significantly degrade during this cook-in step. Thus, according to the improvement of the invention, a moldable meat product may be pressed and vacuum packaged in one operation with substantially no entrapped air, then being ready for cook-in followed by direct shipment for end use. This overall approach may be summarized by the term "cook-in-ship". In addition to the bag being of a shrink material, it also includes a barrier material to prevent oxygen permeation thereby prolonging shelf-life of the final product. Preferably, the cook-in bag will have an interior surface having a tendency for adhesion to meat during cook-in so that exudation of fluids from the meat during cooking will be minimized thereby enhancing appeal of the packaged product.

Figure 4:
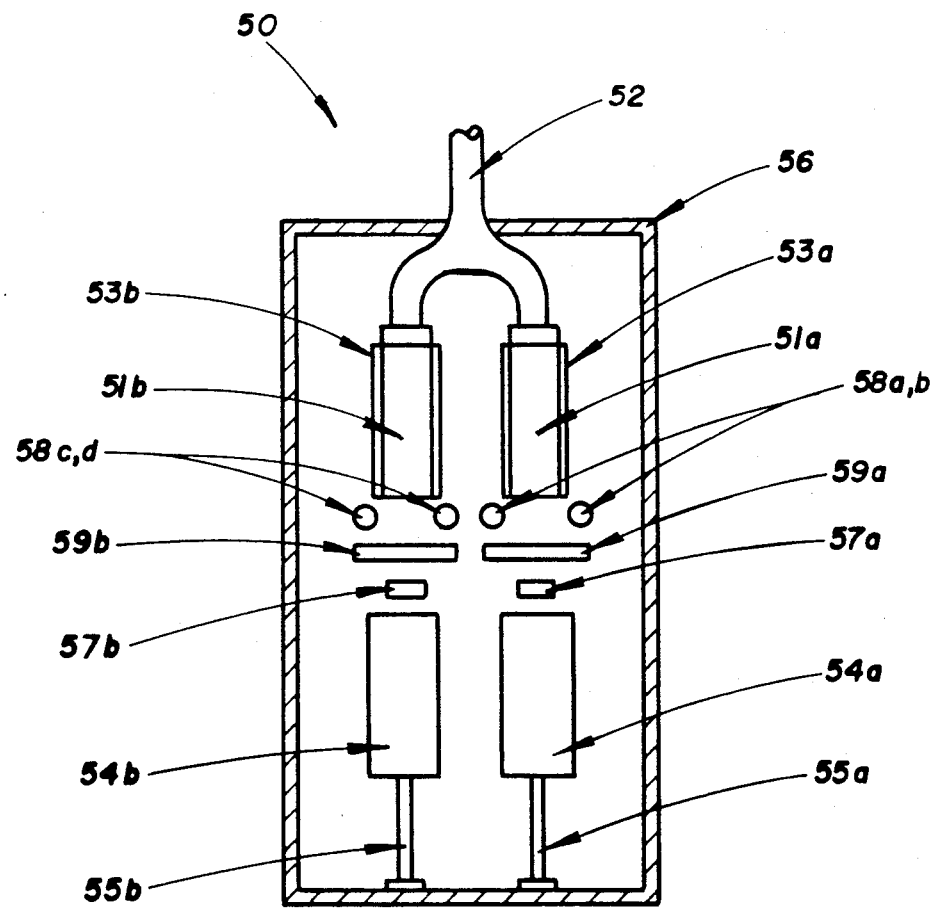
FIG. 4 schematically shows a plan view arrangement of another embodiment for a plural stuffing operation within a single vacuum chamber using a vacuum pump stuffer.

In FIG. 4, there is shown a schematic cross-sectional plan view of an alternative embodiment having a plurality of stuffing horns so that a plurality of stuffed meat vacuum packages may be obtained with a single operating cycle. Dual vacuum stuffer 50 has vacuum chamber 56 which contains stuffing horns 51a,b discharging to bags 53a,b lining molds 54a,b respectively (the molds being shown as retracted). Operation of a cycle is as discussed above with mold retractors 55a,b retracting the stuffed bag lined molds respectively and providing clearance for presser rolls 58a,b and 58c,d, preliminary gatherers 59a,b and in-chamber clippers 57a,b to operate (as described above) respectively. This embodiment differs significantly from the foregoing embodiment also in that a vacuum pump stuffer is used to compact the raw meat into the bag lined mold, i.e. moldable raw meat is pumped from a vacuumized (deaeration) reservoir into and through the stuffing horn. After start up, the horn will be continuously filled with meat as meat portions are repeatedly extruded into bag lined molds during semi-continuous operation. There deaeration holding period at the beginning of a cycle will be sufficient to deaerate the meat surface at the discharge end of the stuffing horn remaining after completion of the previous cycle. Meat pump stuffers are commercially available and generally function using a screw type auger to advance a log of moldable meat. Representative meat pump stuffers are available from Vemag GmbH of West Germany. This dual arrangement can be similarly extended for the desired number of simultaneous stuffings.

Although the present invention has been described in conjunction with preferred embodiments, it is to be understood that modifications and variations may be utilized without departing from the principals and scope of the invention, as those skilled in the art will readily understand. Accordingly, such modifications and variations may be practiced within the scope of the following claims:

What is claimed is:

1. In a method for vacuum packaging a moldable meat product, including the steps of:
   (a) loading a moldable meat product into a stuffing horn of a meat stuffer within a vacuum chamber;
   (b) placing a heat shrinkable, cook-in thermoplastic bag onto said horn, and then a cooking mold over said bag so that said bag lines said mold, the length of said bag being greater than the length of said mold to define a bag neck portion;
   (c) vacuumizing said chamber; and after a holding period sufficient to deaerate said meat,
   (d) advancing said meat from said horn to fill the bag lined mold;
   (e) substantially removing meat from within said bag neck;
   (f) retracting said mold from said horn and closing said bag neck by gathering and clipping; and
   (g) venting said vacuum chamber, improvement comprising:
      (i) coincidentally with advancing said meat, advancing a disposable plate behind said meat into said bag lined mold;
      (ii) coincidentally with advancing said plate, expelling meat trailings from the bag neck;
      (iii) closing said bag neck around said plate, the shape of said plate corresponding to the transverse cross sectional shape of said horn;
      (iv) the steps of the method being accomplished while the meat is under continuous vacuumization.

* * * * *

UNITED STATES PATENT AND TRADEMARK OFFICE
CERTIFICATE OF CORRECTION

PATENT NO.  : 4,672,793
DATED       : June 16, 1987
INVENTOR(S) : Frank M. Terlizzi, Jr. and Bernardus G. Langen It is certified that error appears in the above-identified patent and that said Letters Patent is hereby corrected as shown below:

In the claims, at column 6, line 53, insert --the-- before the word "improvement".

Signed and Sealed this

Fifth Day of January, 1988

Attest:

DONALD J. QUIGG

Attesting Officer

Commissioner of Patents and Trademarks